United States Patent [19]

Kimura

[11] Patent Number: 5,071,462
[45] Date of Patent: Dec. 10, 1991

[54] METHOD AND APPARATUS FOR PRODUCING ORGANIC FERTILIZER WITH THE USE OF NITROGEN FIXING BACILLUS

[76] Inventor: Yosiaki Kimura, 902, Aza-Ameku, Naha, Japan

[21] Appl. No.: 301,209

[22] Filed: Jan. 24, 1989

Related U.S. Application Data

[63] Continuation-in-part of Ser. No. 248,232, Sep. 19, 1988, abandoned, which is a continuation of Ser. No. 943,216, Dec. 18, 1986, abandoned.

[30] Foreign Application Priority Data

Dec. 27, 1985 [JP] Japan .................... 60-293057
Dec. 27, 1985 [JP] Japan .................... 60-293058

[51] Int. Cl.⁵ .................... C05F 11/08; C05G 3/08
[52] U.S. Cl. .................... 71/7; 71/9; 71/12; 71/16; 71/903; 71/904
[58] Field of Search .................... 71/1, 79, 11, 12, 16, 71/23, 903, 904

[56] References Cited

U.S. PATENT DOCUMENTS 3,988,141 10/1976 Kajiyama .................... 71/63
4,167,450 9/1979 Chesbro et al. .................... 435/818 X Primary Examiner—Ferris H. Lander
Attorney, Agent, or Firm—Blum Kaplan

[57] ABSTRACT

To produce organic fertilizer which is effective for sterile agricultural land, a mixture comprising coral reef powder, domestic animal excreta, sewage disposal waste and ground cellulose derived from plant fiber is prepared and it is well mixed in the presence of organic compounds and inorganic salts. Thereafter, it is subjected to cultivating in a multi-bath type cultivating bath for a predetermined period of time while temperature and pH are adjusted properly. Cultivation is achieved with the addition of bacilli including nitrogen fixing bacillus such as *Azotobactor vinelandii, Bacillus megaterum, Rhizobium leguminosarm* or the like, *Trichoderma virde* acting as raw fiber decomposing bacillus, candida utilus acting as yeast fungus and green algae, each of which is cultivated under the operating condition of symbiosis cultivation. The pH in the cultivating bath is maintained in the range of 5.5 to 7.5, preferably in the range of 6 to 7. After completion of cultivation, the mixture is dried to form dried product and the latter is shipped to users.

23 Claims, 9 Drawing Sheets

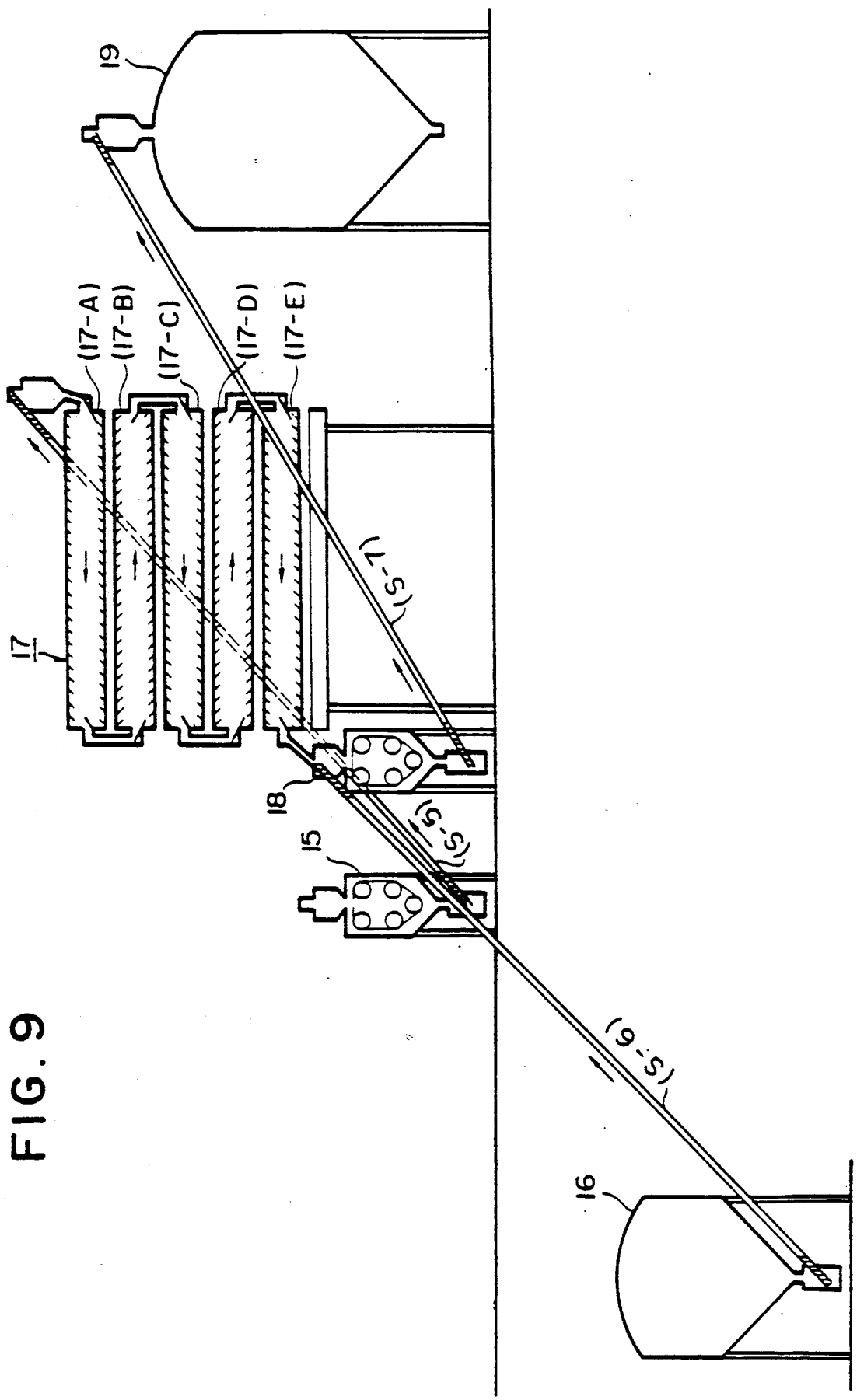

5,071,462

METHOD AND APPARATUS FOR PRODUCING ORGANIC FERTILIZER WITH THE USE OF NITROGEN FIXING BACILLUS

CROSS-REFERENCE TO RELATED APPLICATIONS

This application is a continuation-in-part of application Ser. No. 248,232, filed Sep. 19, 1988 which is a continuation of application Ser. No. 943,216, filed on Dec. 18, 1986, both now abandoned.

BACKGROUND OF THE INVENTION

The present invention relates to a method of producing organic fertilizer with the use of nitrogen fixing bacillus. Further, it relates also to an apparatus for practicing the aforesaid method.

As is well known by any expert in the art, there have been hitherto made a number of proposals as to a method of producing organic fertilizer. To practice the conventional methods various kinds of raw materials and processes were employed but each of them has drawbacks in terms of procurement of raw material and cost.

SUMMARY OF THE INVENTION

Hence, the present invention has been made with the foregoing background in mind and its object resides in providing a method of rationally producing a high quality of organic fertilizer at the highest economical level using raw material which can be easily procured at the most inexpensive cost.

Other object of the present invention is to provide an apparatus for practicing the aforesaid method in the optimum manner.

To accomplish the first-mentioned object there is proposed according to one aspect of the present invention a method of producing organic fertilizer with the use of azotobacter acting as nitrogen fixing bacillus, wherein coral reef granular powder having a grain size in the range of 10 to 200 mesh, domestic animal excreta, sewage disposal waste and ground cellulose derived from plant fiber are mixed with one another in the presence of organic compounds and/or inorganic salts for pH adjustment in a storage tank and the thus prepared mixture to which azotobacter has been added is subjected to cultivating in a cultivating bath for a predetermined period of time while temperature and pH are adjusted properly and air is fed therein. The method further includes one or more steps of adding *Bacillus megaterum* (aerobic bacteria) which is effective for increasing the amount of nitrogen-fixation under symbiotic conditions with the azotobacter, *Rhizobium leguminosarm* which is effective for increasing agricultural production, *Trichoderma virde* acting a raw fiber decomposing bacillus, *Candida utilis* acting as yeast fungus and a chlorella to the mixture each of which is cultivated under the operating condition of symbiosis cultivation.

To accomplish the first mentioned object there is proposed according to another aspect of the present invention a method of producing organic fertilizer comprising:

mixing coral reef granular powder, domestic animal excrement, sewage disposal waste and ground cellulose to obtain a first mixture;

adding to said first mixture, another mixture organic compounds, inorganic salts and nitrogen fixing bacillus, *Trichoderma virde, Candida utilis* and chlorella to obtain a second mixture;

said nitrogen fixing bacillus including azotobacter which functions as nitrogen fixing bacillus to said second mixture, *Bacillus megaterus*, and *Rhizobium leguminosarm;* and cultivating said second mixture in a cultivating bath, under symbiotic cultivation conditions to yield organic fertilizer.

Further, to accomplish the last-mentioned object there is proposed according to another aspect of the present invention an apparatus for producing organic fertilizer with the use of nitrogen fixing bacillus which is characterized in that the apparatus comprises a storage tank in which domestic animal excreta, sewage disposal waste and ground cellulose derived from plant fiber are stored and to which a properly determined amount of coral reef in the form of powder is delivered from a coral storage tank, a steam drum for sterilizing raw material mixed in the storage tank under the effect of heat of steam, a temperature adjusting tank in which the raw material subjected to sterilizing in the steam drum is received to cool it at a properly adjusted temperature, a master bacillus adding tank in which the raw material is received from the temperature adjusting tank to add to the raw material master bacilli inclusive nitrogen fixing bacillus, a cultivating bath in which the mixture with master bacilli added thereto is received from the master bacillus adding tank, cultivating liquid is received from a bacillus cultivation source mixing tank and auxiliary master bacillus liquid is received from a master bacillus cultivating tank so that the thus received mixture and liquids are subjected to cultivating for a predetermined period of time, a cultivated material accumulating tank in which the cultivated material mixture is received from the cultivating bath and it is then agitated and a drier connected to the cultivated material accumulating tank.

To facilitate understanding of the present invention the following description will be helpful.

In Okinawa Prefecture there exists a huge amount of coral reef. Accordingly, raw material which can be easily procured at the most inexpensive cost is constituted by a combination of coral reef, domestic animal excreta, sewage disposal waste and cellulose such as bagasse or the like for the purpose of practicing the present invention. Organic compounds and inorganic salts are added to the mixture of raw material to adjust pH and the thus prepared mixture is cultivated in a cultivating bath in which cultivation is achieved with an addition of bacilli under the operating condition of symbiosis cultivation.

Specifically, coral reef granular powder having a grain size in the range of 10 to 200 mesh, domestic animal excreta, sewage disposal waste and ground cellulose are mixed with one another in the presence of organic compounds and inorganic salts in a storage tank and the thus prepared mixture is subjected to cultivating for a predetermined period of time in a cultivating bath while temperature and pH are adjusted properly and air is blown in the interior of the cultivating bath. Bacilli to be added to the mixture in the cultivating bath include nitrogen fixing bacillus such as *Azotobacter vinelandii, Bacillus megaterm, Rhizobium leguminosarm* or the like, *Trichoderma virde* acting as raw fiber decomposing bacillus, *Candida utilis* acting as yeast fungus and a green algae each of which is cultivated under the operational condition of symbiosis cultivation whereby cultivated material having a high degree of nitrogen fixation is obtained.

An advantageous effect of the present invention is that any required earth such as loess, wind filed material in the desert district, volcanic ash soil, coal cinders or like can be utilized.

In order to carry out symbiosis cultivation in the presence of nitrogen fixing bacilli, required granular earth and pulverized coral reef ($CaCO_3$) or calcareous component (CaO) are mixed with one another and the thus prepared mixture is then mixed further with domestic animal excreta, sewage disposal waste, ground cellulose, organic compounds and inorganic salts. Thereafter, the mixture is subjected to cultivating in a cultivating bath while temperature and pH are adjusted properly and air is fed into the interior of the cultivating bath. At this moment bacilli to b added to the mixture comprise nitrogen fixing bacillus such as *Azotobacter vinelandii, Bacillus megaterum, Rhizobium leguminosarm* or the like, *Trichoderma virde* acting as raw fiber decomposing bacillus, *Candida utilus* acting as yeast fungus and green algae chlorella each of which is cultivated under the operational condition of symbiosis cultivation. As a result, organic fertilizer comprising cultivated material having a high degree of nitrogen fixation can be produced.

In a preferred embodiment of the invention the pH of the mixture subjected to cultivation is maintained in the range of 5.5 to 7.5, preferably in the range of 6 to 7. The cultivating bath is preferably constructed in a multibath type so that continuous cultivation is achieved with a time difference of H/N (where H represents cultivating time and N does the number of baths). Supply sources of the above mentioned micro-organisms used for practicing the invention are as shown below.

(1) *Azotobacter vinelandii* (IAM) 1078, supplied from Application Micro-organism Research Institute, Tokyo University
(2) *Bacillus megaterum* (AHU) 1240, supplied from Agriculture Faculty, Hokkaido University;
*Bacillus megatarum* (IAM) 1032, supplied from Application Micro-organism Research Institute, Tokyo University
(3) *Rhizobium leguminosarm* (AHU) 1131, supplied from Agriculture Faculty, Hokkaido University
(4) *Trichoderma virde* (IFO) 4847, Fermentation Research Institute (foundational judicial person) in Osaka;
*Trichoderma virde* (AHU) 9276, supplied from Agriculture Faculty, Hokkaido University
(5) *Candida utilis* (IFO) 0262, supplied from Fermentation Research Institute (foundational judicial person) in Osaka
(6) *Chlorella,* supplied from a certain chlorella cultivator It is said that a high degree of acidity of agricultural soil is attributable to shortage of alkaline components and excessive utilization of conventional chemical fertilizer. Shortage of calcareous component in organic fertilizer leads to malfunctions such as root decaying, greening of ears, brick reduction of sugar cane and others. In view of the facts as mentioned above much attention is paid to the current deterioration of environment of agricultural land and what countermeasure should be taken becomes a problem to be resolved in relation to agricultural production.

Coral reef which is called Ryukyu limestone constituting one of the main raw materials for the organic fertilizer and produced in accordance with the subject invention has a calcareous components (CaO) and is one of the specific mineral resources in the subtropical zone. A main component of coral reef is calcium carbonate ($CaCO_3$) and it contains many minerals. The characteristic properties of coral reef are that it is porous and has a capability of absorption about 30 times as high as that of other limestone to absorb toxic mercury or the like heavy metal for the purpose of neutralization. Thus, by utilizing the characteristic properties of coral reef as mentioned above it is possible to allow organic components such as micro-organisms or the like to be introduced into pores on the coral reef in accordance with the micro-organism enzyme based catalyzer method to produce organic fertilizer containing nitrogen fixing bacilli therein.

Domestic animal excreta, sewage disposal waste, cellulose derived from plant fiber or the like are valuable resources as an organic nutrition source for the purpose of cultivating the above-mentioned kinds of bacilli. It is said that building a good environment for the agricultural land depends on how space is provided for effective micro-organisms, and in order to cultivate nitrogen fixing bacilli in association with cultivation of the agricultural land with the use of fertilizer, it is preferable to cultivate nitrogen fixing bacillus and raw fiber decomposing bacillus under the operational condition of symbiosis cultivation to increase the synergistic effect which is assured in cooperation with cultivation activity with characteristics of each of the bacilli employed.

To prepare the symbiosis cultivation source for green algae chlorella, domestic animal excreta and sewage disposal waste or ground cellulose are mixed with coral reef powder so that organic fertilizer containing a large amount of calcium carbonate and organic component therein is obtained.

Aerobic organism azotobacter species such as *Azotobacter vinelandii* are widely distributed over agricultural land, especially in land where calcareous fertilizer is supplied. It acts in such a manner that it absorbs carbohydrates essential for itself under the condition of symbiosis with green algae and then gives nitrogen nutrition to green algae in return for the aforesaid absorption of carbohydrates so that growth of green algae is promoted over sterile land and sandy land having a shortage in nitrogen component so as to allow them to become fertile land. It is said that whether land is fertile or sterile depends on how a group of azotobacter based bacilli are cultivated. *Bacillus megaterum* is a bacillus which is effective for increasing the amount of nitrogen fixation under the condition of symbiosis with *Azotobacter vinelandii. Rhizobium leguminosarm* is a bacillus which is related to the plant leguminosae or the like and of which cultivated material serves directly for agricultural production. It should be noted that it is suitable for coexistent cultivation with azotobacter.

Next, *Trichoderma virde* is a fiber (cellulose) decomposing bacillus which serves for decomposing cellulose, starch or the like under the condition of symbiosis cultivation with *Azotobacter vinelandii* so that the thus decomposed material becomes nutrition for *Azotobacter vinelandii.* Further, it is also a bacillus which is effective for producing cellobiose, grape sugar, organic acid and others and moreover is advantageous for coexistent cultivation. Further, it is known that it functions to resist against plant disease bacillus and moreover it has a capability of effectively decomposing insoluble substrate.

Next, *Candida utilis* is a coexistent cultivating bacillus which serves for decomposing theriac, starch or the like and of which decomposed material is utilized for *Azotobacter vinelandii* as carbon source to increase the extent of nitrogen fixation. The green algae chlorella synergistically gives nutrition to *Azotobacter vinelandii* and the above mentioned kinds of bacilli during coexistent cultivation with them. Specifically, it acts in such a manner that the above mentioned kinds of bacilli return their nutrition to one another and thereby their cultivation activity is cyclically increased.

In view of the characteristic feature of the bacilli as mentioned above the inventor conducted a variety of research works in a wide area. As a result, he paid attention to utilization of coral reef which is a huge resource in the subtropical zone as well as to alkaline soil to establish a method of producing organic fertilizer in a large scale. The characteristic features of coral reef are that it contains about 97% by weight calcium carbonate ($CaCO_3$), is porous, has an absorption capability absorption, contains a large amount of minerals and moreover it contains components best suitable for the cultivating condition of *Azotobacter vinelandii* which serves as nitrogen fixing bacillus. Further, in terms of amount of resource, coral reef exists in the form of large scaled layer structure in the land area and it is said that the amount of deposition of coral reef in Okinawa Prefecture (inclusive Ryukyu islands) amounts to several tens of billion of tons. In fact, the present invention represents an effective utilization of coral reef which is deposited in a large scale in that way.

Chemical compositions of coral reef are as shown on the following table.

| $CaCO_3$ | CaO | $SiO_2$ | $Fe_2O_3$ | MgO | S | Cl | P | K | Na | Mn | Cu | I | F |
|---|---|---|---|---|---|---|---|---|---|---|---|---|---|
| 97.7 | 54.71 | 0.42 | 0.06 | 0.46 | 0.02 | 0.05 | 0.01 | 0.066 | 0.011 | 0.003 | 0.0014 | 0.01 | 0.05 |

To improve agricultural land or the like with a fertilizer formed from coral reef having the above-noted compositions, domestic animal excreta and ground cellulose, nitrogen fixing bacillus which is most associated with improvement of agricultural land is selected. The reason why *Azotobacter vinelandii* is selected as the main bacillus consists is the high degree of nitrogen fixation. Azotobacter has the following four kinds from which the above mentioned *Azotobacter vinelandii* is selected.

Reference material provided for experiments (An amount of nitrogen fixation is determined per 1 g of substrate of mannit consumed for cultivation experiments)

| name of bacillus | amount of nitrogen fixation |
|---|---|
| *Azotobacter vilrem* | 7.23 mg |
| *Azotobacter vinelandii* | 9.12 mg |
| *Azotobacter beiierinckii* | 5.58 mg |
| *Azotobacter chroococcum* | 6.66 mg |

As will be readily apparent from the above-noted amount of nitrogen fixation, it is preferable that *Azotobacter vinelandii* is selected as a main bacillus. Further, to increase the cultivation efficiency for the purpose of nitrogen fixation, *Bacillus megaterum, Rhizobium leguminosarm, Tricoderum virde* acting as fiber (cellulose) decomposing bacillus, *Candida utilis* acting as yeast fungus and green algae chlorella, each of which has a synergistic effect are cultivated under the operational condition of symbiosis cultivation whereby organic fertilizer is produced by utilizing nitrogen fixing bacillus for which a natural cycle is utilized with respect to each of the above mentioned kinds of bacilli.

To adjust nutrition source of the above-mentioned kinds of bacilli and pH, organic compounds and inorganic salts are used. For example, grape sugar or waste theriac ($C_6H_{12}O_6$), ammonium sulfate (($NH_4$)$_2SO_4$), urea ($CO(NH_2)_2$), ammonia water ($NH_4OH$), calcium superphosphate ($KH_2PO_4$), magnesium sulfate ($MgSO_4 7H_2O$) and potassium nitrate ($KNO_3$) are added to the mixture of coral reef, domestic animal excreta and sewage disposal waste or ground cellulose (derived from plant fiber) and the thus prepared mixture is continuously cultivated while temperature is maintained in the range of 25° to 35° C. and pH is maintained in the range of 6 to 7.

Continuous cultivation is achieved in a multi-bath type cultivating bath in which the moisture ratio is adjusted at an intermediate level between that for solid cultivation and that for liquid cultivation. During cultivating operation air is blown into the interior of the cultivating bath with a time difference of H/N (where H represents cultivating time in hours and N does the number of baths). By utilizing *Azotobacter vinelandii* and others as nitrogen fixing bacillus, cellulose and insoluble material in the cultivating soil are decomposed and at the same time grape sugar is produced. In the meanwhile, *Trichoderma virde* which is effective for inhibiting activity of plant disease bacillus is cultivated under the operational condition of symbiosis cultivation. It should be added that symbiosis cultivation of *Candida utilis* which decomposes sugars produced in the presence of *Trichoderma virde* as well as symbiosis cultivation of green algae chlorella which has a remarkable synergistic effect for cultivation of the above-mentioned kinds of bacilli constitute characteristic features of the present invention.

A function of chlorella is to produce carbohydrate which is consumed as nutrition material for nitrogen fixing bacillus. Chlorella includes protein in the range of 40 to 50 weight %, fatty material in the range of 10 to 30 weight %, hydrocarbon in the range 10 to 25 weight % and ash in the range of 6 to 10 weight %. Further, the chlorella contains nutritious elements which serve as nutrition for *Azotobacter vinelandii* or the like which act as nitrogen fixing bacillus whereby cultivation power is intensified under the operational condition of coexistence.

An apparatus for processing a cultivating substrate with which the above-mentioned kinds of bacilli are cultivated under the operational condition of symbiosis cultivation is constructed in consideration of various conditions in terms of physical processing, chemical processing and biochemical processing.

Other objects, features and advantages of the present invention will become readily apparent from reading of the following description which has been prepared in conjunction with the accompanying drawings.

BRIEF DESCRIPTION OF THE DRAWINGS

The accompanying drawings will be briefly described below.

FIG. 9 is a schematic front view of a multistage type drier.

DESCRIPTION OF THE PREFERRED EMBODIMENTS

Now, the present invention will be described in a greater detail hereunder with reference to the accompanying drawings which illustrate preferred embodiments thereof.

Figure 1:
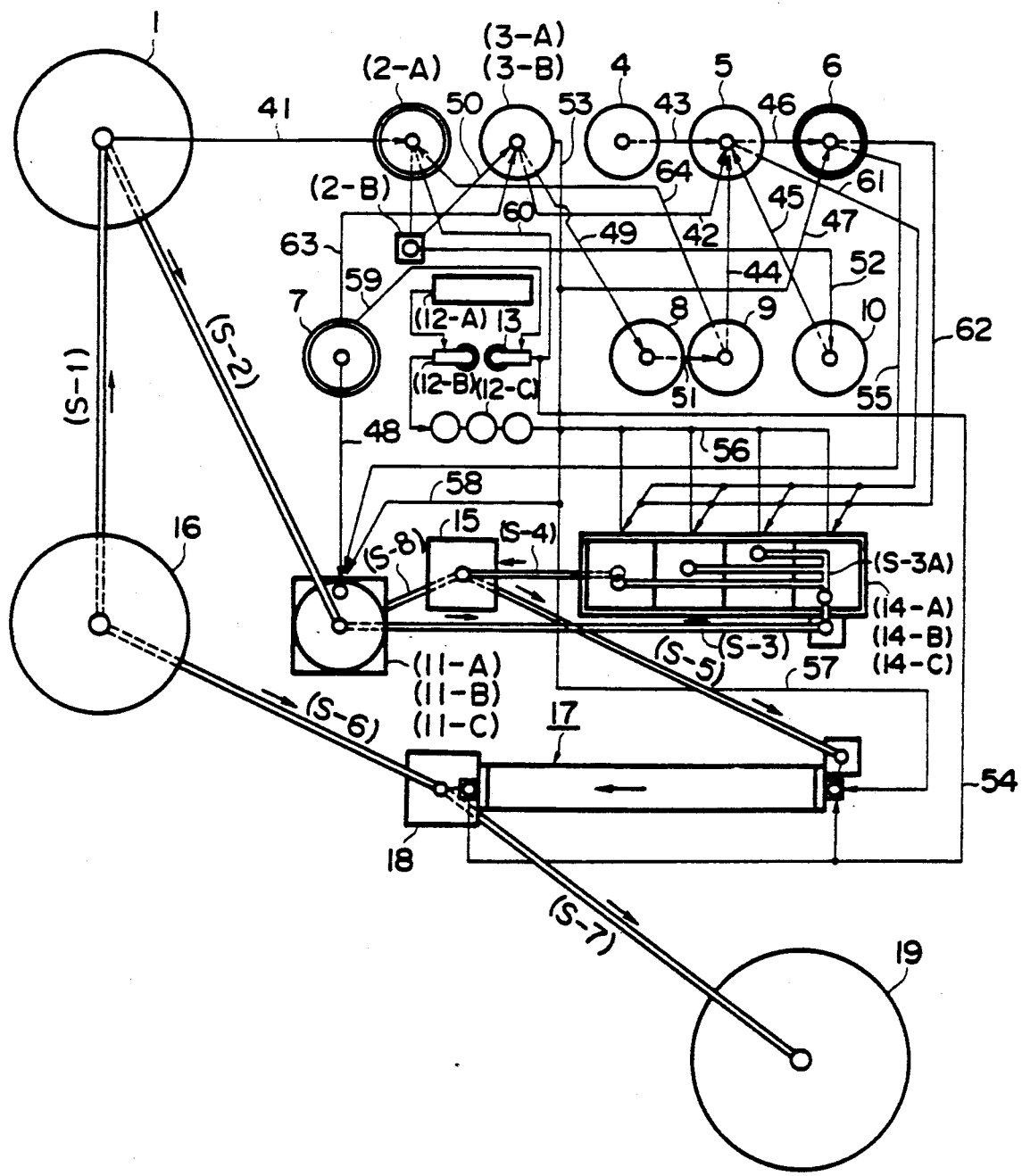
FIG. 1 is a schematic plan view of a cultivating apparatus in accordance with an embodiment of the invention.

FIG. 1 is a plan view of a cultivating apparatus which is utilized to practice the method of the invention. The apparatus includes a storage tank 1 in which excreta of domestic animal such as cock, hen, cow, bull, pig or the like is stored. In addition muddy waste from a sewage disposal plant and agricultural waste such as ground bagasse are mixed with excreta of domestic animal in the storage tank 1. Excreta of domestic animal, sewage disposal waste and ground bagasse constitute the best cultivating medium for nitrogen fixing bacillus of azotobacter and cellulose decomposing bacillus of trichoderma.

Further, the apparatus includes a storage tank 16 in which processed coral reef powder is stored and the stored coral reef powder is delivered to the storage tank 1 by operating a screw conveyor S-1 which is mounted on the lower part of the storage tank 16. When coral reef powder is mixed with excreta of domestic animal, proper consideration is taken to produce mixture at the following mixing ratio which is best suitable for growing azotobacter or the like bacillus. Specifically, the mixture preferably includes excreta of domestic animal and sewage disposal waste of about 30±10 weight %, ground cellulose of 10±5 weight and coral reef powder of 60±20 weight % and it is kept in the well-mixed state in the storage tank 1.

Figure 3:
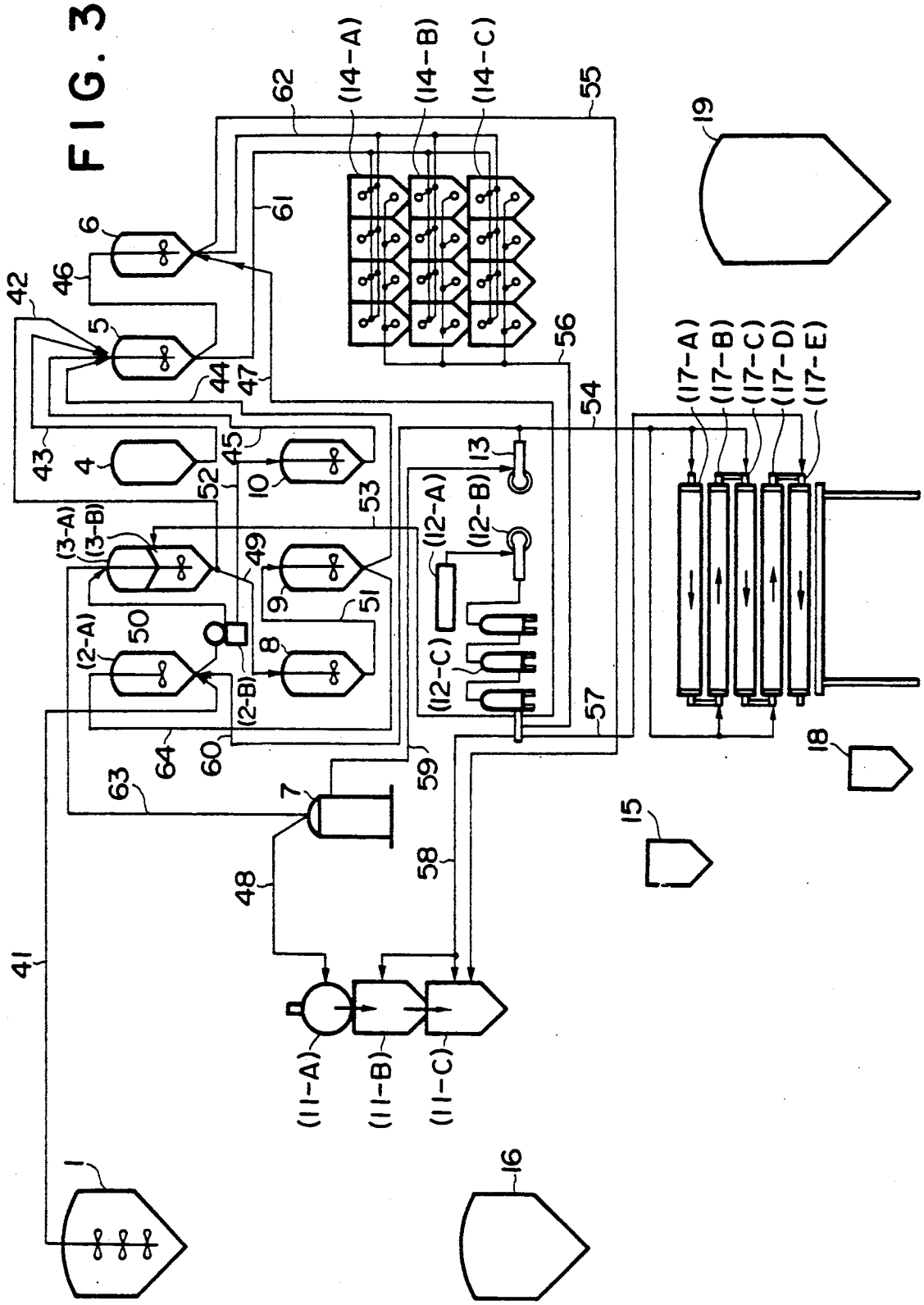
FIG. 3 is a piping flow sheet of the apparatus in FIG. 1.

The cultivating medium thus prepared in the presence of symbiosis bacilli is stored in the storage tank 1 and the well-mixed mixture is delivered to a steam pressure drum 11-A by operating a screw conveyor S-2 which is mounted on the lower part of storage tank 1. As shown in FIG. 3, which is a piping flow sheet, high pressure steam is delivered from a steam boiler 7 to steam pressure drum 11-A by way of a pipe 48 in order to satisfactorily achieve sterilization under the effect of high pressure steam. Steam pressure is selected in the range of 9 to 12 Kg/cm$^2$ and therefore a highly rigid drum in which cellulose (plant fiber material) or the like is explosively broken under the effect of high pressure steam is employed for the steam pressure drum 11-A so that boiling time can be reduced remarkably.

The mixture of excreta of domestic animal sewage disposal waste and ground cellulose which has been sufficiently sterilized and softened by boiling in the steam pressure drum 11-A is delivered to a temperature adjusting tank 11-B which is disposed below the steam pressure drum 11-A. As shown in FIG. 3, cooled air is blown into the temperature adjusting tank 11-B from a refrigerator 12-A and a cool air compressor 12-B via a plurality of air filters 12-C and a pipe 58 whereby temperature in the tank 11-B is adjusted to the optimum bacillus cultivating temperature in the range of 25° to 35° C. Thereafter, the temperature adjusted mixture is delivered to master bacillus adding tank 11-C.

Figure 2:
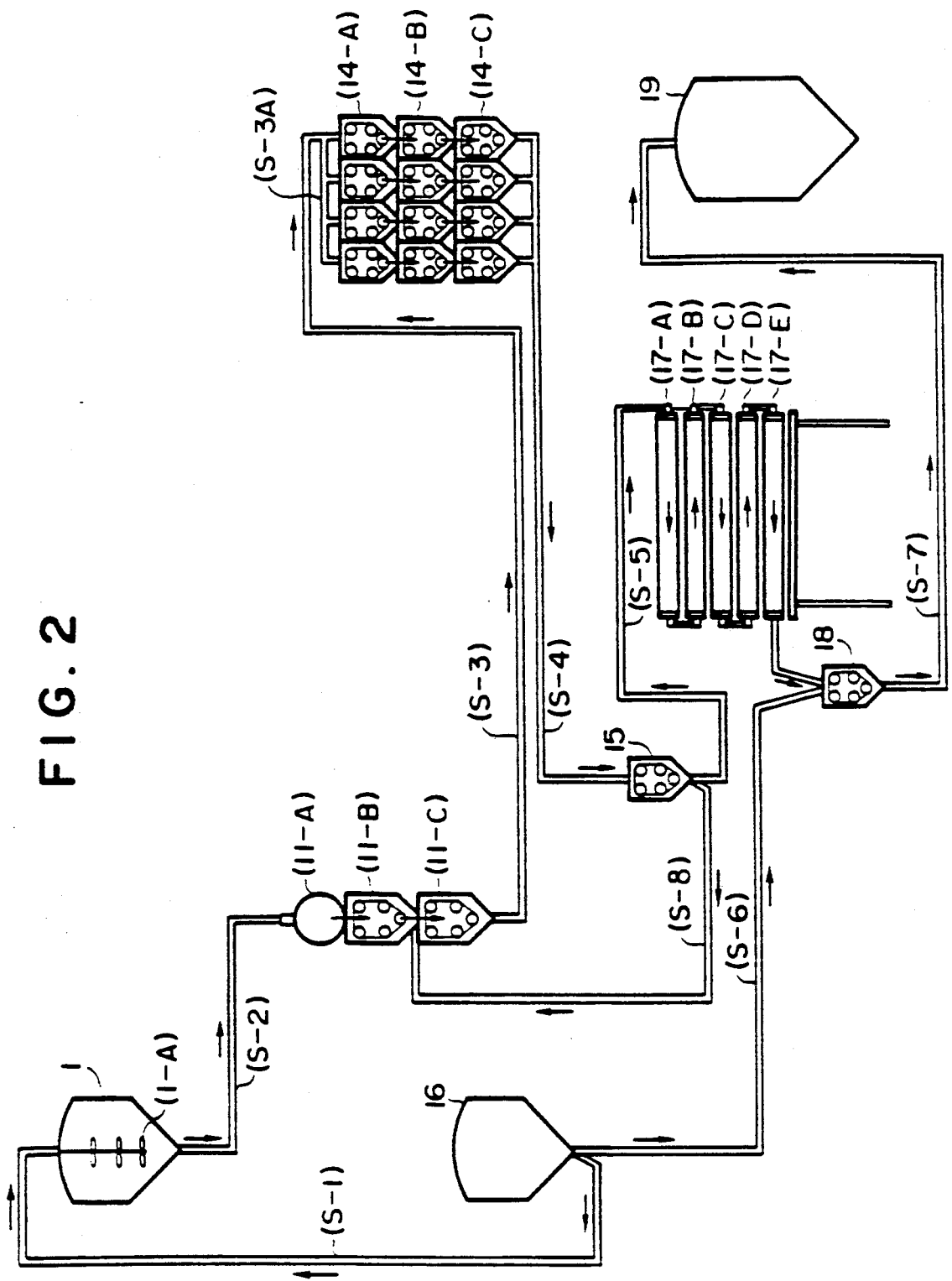
FIG. 2 is a flow sheet of the apparatus in FIG. 1 which includes a plurality of screw conveyors S-1 to S-8 by means of which prepared mixture is delivered.
Figure 4:
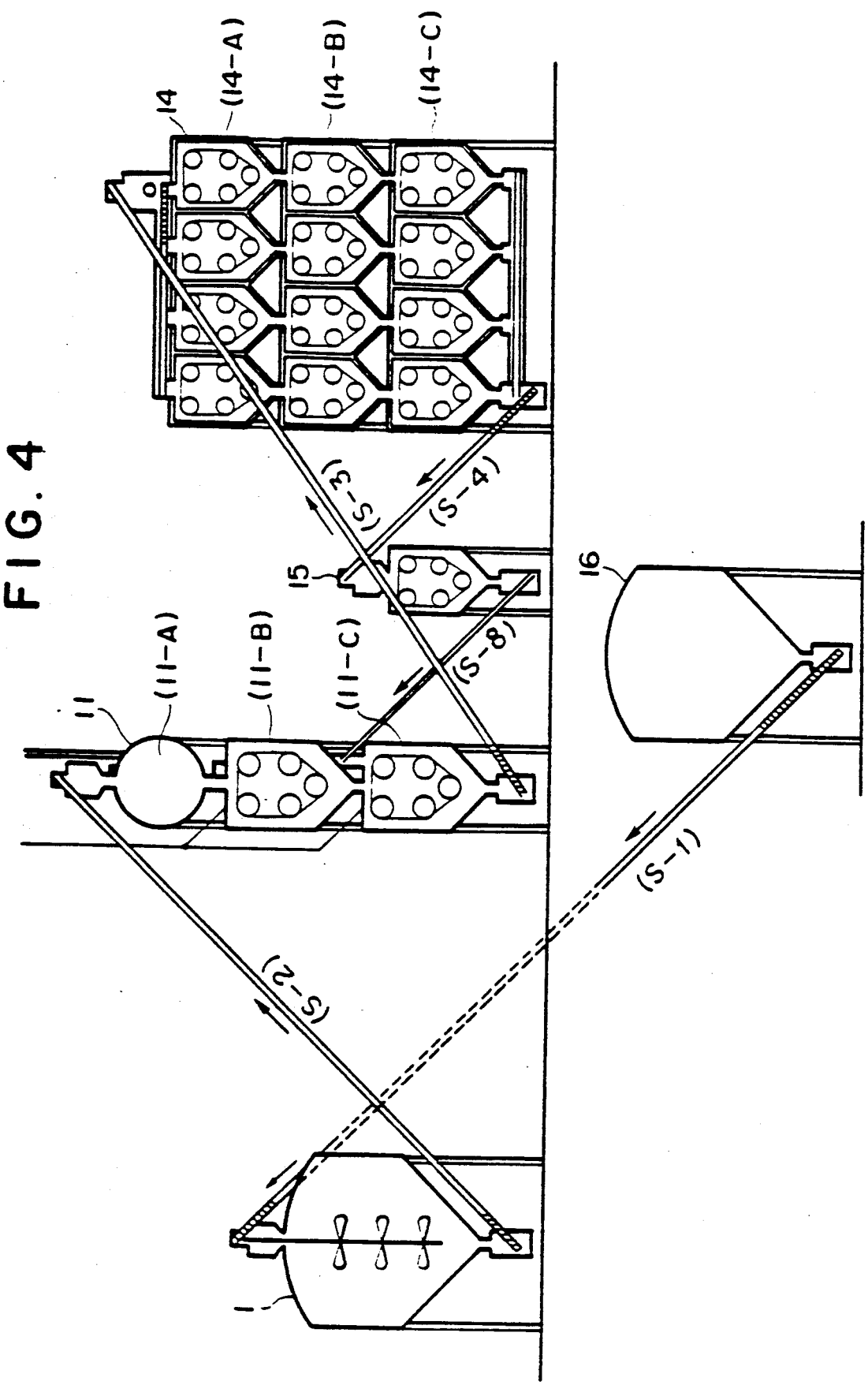
FIG. 4 is a schematic front view of a multi-bath type cultivating bath usable for the apparatus.

As shown in FIG. 3, six kinds of symbiosis bacilli are cultivated in a master bacillus tank 6 and liquid containing master bacillus therein is delivered to the master bacillus adding tank 11-C by way of a pipe 55. Further, as shown in FIG. 2, a mixture which has been fermented in a multi-bath type fermenting bath is delivered to the master bacillus adding tank 11-C from a fermented material accumulating tank 11 as auxiliary material for master bacillus by operating a screw conveyor S-8. The mixture which has been sufficiently agitated in the master bacillus adding tank 11-C, that is the mixture including coral reef powder, excreta of domestic animal, sewage disposal waste, ground cellulose, liquid containing master bacillus and cultivated material serving as auxiliary material for master bacillus (including the organic compounds and inorganic salts), is delivered to the multi-bath type continuous cultivating bath 14 by operating a screw conveyor S-3 which is mounted on the lower part of the master bacillus adding tank 11-C, as shown in FIGS. 2 and 4.

According to a preferred embodiment, the method of the invention has been practiced using raw material of which composition is as noted below in terms of ratio by weight.

| <ratio by weight per 100 Kg> | | |
|---|---|---|
| a. pulverized coral reef (inclusive moisture of 10%) | 50% | 50 Kg |
| b. organic materials, i.e., excreta of domestic animal, sewage disposal waste, ground cellulose, etc. (inclusive moisture of 30%) | 30% | 30 Kg |
| c. cultivating material such nitrogen bacillus, etc. (inclusive moisture of 80%) | 20% | 20 Kg |

Namely, the present invention is concerned with a method of producing organic fertilizer with the use of nitrogen fixing bacilli which are mixed with raw material according to the composition represented by the above weight ratio.

Figure 5:
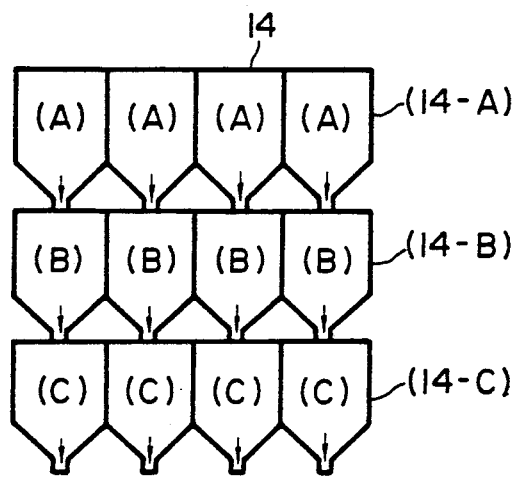
FIG. 5 is an illustrative view for visually explaining a time difference H/N relative to the multi-bath type cultivating bath.

The optimum cultivating period of time in the multi-bath type continuous cultivating bath 14 has been found to be about 12 hours. As shown in FIG. 5, three stages of cultivating baths A, B and C are connected to one above another. (When a cultivating period of time in hours is represented by H and the number of cultivating baths is represented by N,) a cultivating period of time H per one cultivating bath is 4 hours and the number of stages N is 3 whereby the optimum cultivating period of time for the multi-bath type continuous cultivating bath 14 amounts to about 12 hours.

The apparatus of the invention is so constructed that continuous delivery of mixture which is still not cultivated is achieved with a certain time difference on the assumption that a treating period of time for the steam pressure drum 11-A, the temperature adjusting tank 11-B and the master bacillus adding tank 11-C is maintained for about 1 hour, respectively. For instance, on the assumption that a cultivating period of time H per one bath is about 4 hours and one cultivating bath has a capacity of 10 tons, an amount of production of cultivated product per one day, that is, per 24 hours amounts to 240 tons when N (the number of cultivating baths) is 12 and a cultivating period of time H is 12 hours for three stages. It should be noted that since the time difference between the adjacent processing stages can be reduced by explosively treating the animal excreta under the effect of boiling pressure, large scale production can be practiced by enlargement of production scale and increased installation of cultivating baths. Further, explosive treating under the effect of boiling is intended to produce cultivated material which allows bacillus to permeate easily therethrough due to sterilization of plant disease fungus, softening of mixture cellulose or the like while bacilli are cultivated.

A step of mixing the aforesaid organic compounds and inorganic salts together is performed in the following manner. Namely, they are mixed together in the bacillus cultivation source mixing tank 5, pH of the prepared mixture is thus properly adjusted, master bacilli are cultivated in the aforesaid substrate during an operative step of the master bacillus cultivating tank 6, and the bacillus cultivating substrate in which the aforesaid organic compounds and inorganic salts are mixed together is then delivered to three multistage type continuous cultivating baths 14 via a pipe 62.

The organic compounds are quantitatively mixed with the inorganic salts to adjust pH in the bacillus cultivation source tank in such a manner as noted in the following table by way of The following weights are added per 100 liters.
1. Condensed chlorella liquid (introduced into the tank 5 from the chlorella tank 10 in the form of a condensed liquid containing chlorella therein)—5%
2. Grape sugar or waste theriac ($C_6H_{12}O_6$)—(introduced thereinto from the theriac tank 4)—0.5%
3. ammonium sulfate $(NH_4)_2SO_4$—2% urea $CO(NH_2)_2$—2% ammonia $NH_4OH$—0.5% calcium superphosphate $CaH_4(PO_4)_2$—30 grams potassium phasphate $KH_2PO_4$—120 grams magnesium sulfate $MhSO_47GH_2$—250 grams potassium nitrate $KNO_3$—550 grams
(all introduced into tank 5 from the reagent mixing and storing tank 9)
4. Temperature 25° to 35° C. pH 6 to 7

In accordance with the above-mentioned mixing method, the nutrition source for microorganisms and the reagents are sufficiently mixed together in the bacillus cultivation source mixing tank 5, pH of the thus agitated mixture is properly adjusted continuously during mixing and the thus prepared mixture is then delivered to the master bacillus cultivating tank 6 via a pipe 46.

As shown in FIGS. 1 and 2, mixture with master bacilli added thereto is continuously delivered to the multi-bath type cultivating bath 14-A including four baths 14-A as shown in FIG. 5 by operating a screw conveyor S-3A wherein cultivation is carried out in the multi-bath type continuous cultivating bath 14-A with a time difference of H/N as mentioned above. Delivering of the mixture is achieved in such a manner that one bath in the cultivating bath 14-A takes about 1 hour until it is filled with the mixture cultivation in the one bath takes about 4 hours and the mixture is subsequently delivered to each of the baths in the same stage. The mixture which has been delivered in that way is cultivated in each of the baths in the multistage type cultivating bath 14-A while consuming 4 hours in one bath and thereafter it is subsequently delivered to the cultivating baths 14-B and 14-C which are disposed below the first-mentioned one 14-A. Cultivated liquid is delivered to each of the cultivating baths from the bacillus cultivation mixing tank 5 via a pipe 61, while auxiliary master bacillus liquid is delivered to each of the cultivating baths from a master bacillus cultivating tank 6 via a pipe 62, as shown in FIG. 3 which is a piping flow sheet. As a result, cultivation in each of the cultivating baths is intensified and thereby nitrogen fixing bacilli or the like are increasingly cultivated.

Figure 6:
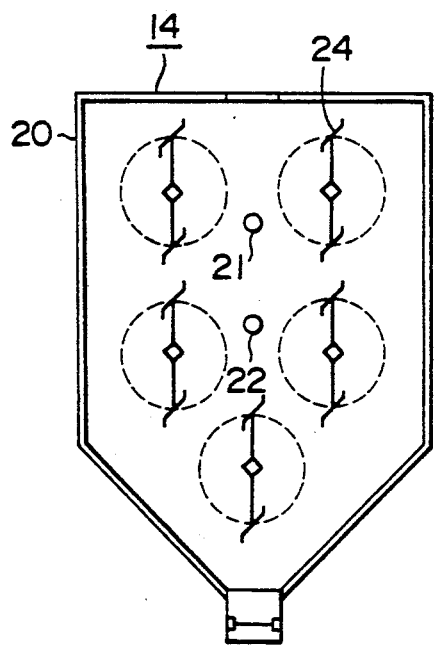
FIG. 6 is a vertical sectional view of the multi-bath type cultivating bath.
Figure 7:
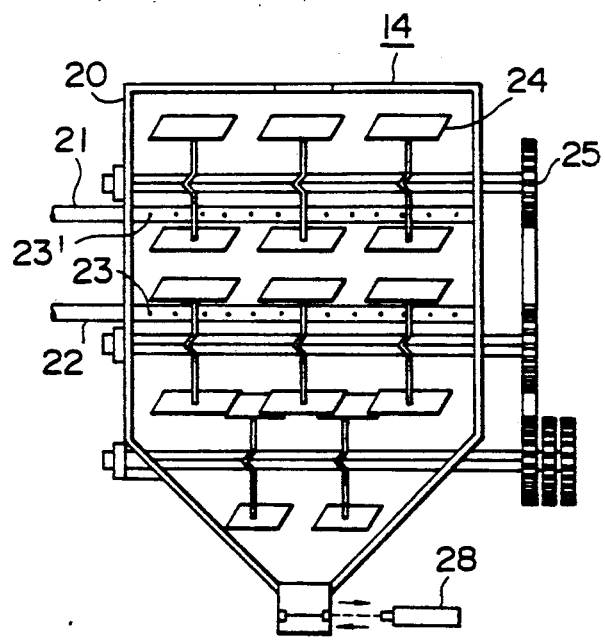
FIG. 7 is a schematical perspective sectional view of the multi-bath type cultivating bath.
Figure 8:
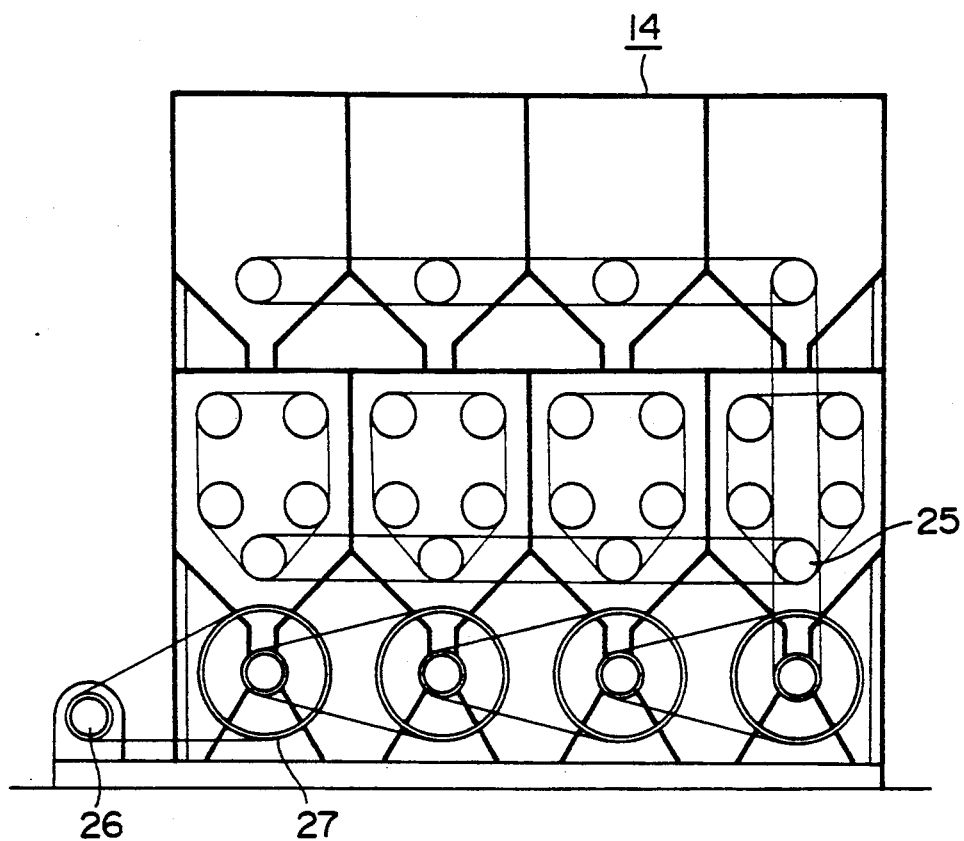
FIG. 8 is an illustrative view for a rotational agitating unit for the multi-bath type cultivating bath.

The unit into which cultivating liquid and auxiliary master bacillus are delivered are illustrated in FIG. 6 (vertical sectional view of the multi-bath type cultivating bath wherein in the drawing reference numeral 21 designates a bacillus cultivation source nozzle) as well as in FIG. 7 (cross-sectional view of the multi-bath type cultivating bath wherein in the drawing reference numeral 21 designates a bacillus cultivation source nozzle pipe). The structure of the cultivating bath is as shown in FIGS. 6 and 7. As is apparent from the drawings, a double wall 20 for the cultivating bath serves as a temperature adjusting wall which is effective for adjusting the temperature relative to the outside. which is connected to a pipe 56 extending from the refrigerator 12-A, the air compressor 12-B and the air filters 12-C as shown in FIG. 1 (plan view of the cultivating apparatus) and FIG. 3 (piping flow sheet). Air having a lower temperature which has passed through the pipe 56 is introduced into the interior of the cultivating bath 14 through a number of nozzle holes 23 so that a cultivating temperature in the cultivating bath 14 is adjusted as required. The optimum cultivating temperature is determined in the range of 25° to 35° C.

During cultivating operation the cultivating mixture to which nourishing liquid and bacilli are added and air (oxygen) or the like is introduced is subjected to uniform agitating with the aid of a plurality of agitating members 24 so as to improve introduction of air, oxygen or the like into the mixture whereby operating temperature is properly adjusted and cultivating conditions are improved. As shown in the drawings, the cultivating bath 14 is provided with sprocket wheels 25, a driving motor 26, a pulley 27 and V-belts or chain belts so that the agitating propellers 24 are rotated at a rotational speed of 2 revolutions per 10 seconds to agitate slowly the contents held in the cultivating bath 14. The mixture is maintained at the optimum temperature as mentioned above and pH of the mixture is controlled within the range of 6 to 7 whereby the environmental conditions best suitable for cultivation are established. The thus properly cultivated mixture is taken out through the outlet port located at the lowermost end of the cultivating bath 14 at every four hours by operating the hydraulic cylinder 28 so that it is successively delivered to the lower cultivating baths. Thus, cultivating is effected further also in the lower cultivating baths 14-B and 14-C in the same manner as mentioned above. As shown in FIGS. 1, 2 and 4, the cultivated mixture containing a large amount of nitrogen fixing bacilli and others therein is delivered to the cultivated product accumulating tank 15 by operating a screw conveyor S-4.

The inner structure of the cultivated product accumulating tank 15 is substantially similar to that of the cultivating bath as shown in FIGS. 6 and 7. As shown in the drawings, it is equipped with a plurality of mixture agitating propellers and a part of the well agitated mixture is delivered to the master bacillus adding tank 11-C by operating screw conveyor S-8 which is disposed at the lower part of the cultivated material accumulating tank 15 so that it acts as auxiliary master bacillus as shown in FIGS. 1, 2, and 4. Thus, auxiliary master bacilli are returned thereto. As shown in FIGS. 1, 2 and 9, the residual cultivated mixture is delivered to a drier 17-A by operating a screw conveyor S-5 which is disposed at the lower part of the cultivated material accumulating tank 15.

As will be apparent from the drawings, the drier 17 comprises five stages A, B, C, D and E which are arranged one above another. Owing to the arrangement made therefore in that way it is assured that the drier 17 has an elongated drying passage and temperature adjusting can be effected in such a manner as to activate the symbiosis cultivation bacilli or the like. A cylindrical drum 17 at each of five stages constituting the drier 17 simultaneously carries out transference and agitation of the mixture while it is rotating in order to assure the optimum drying.

Figure 12:
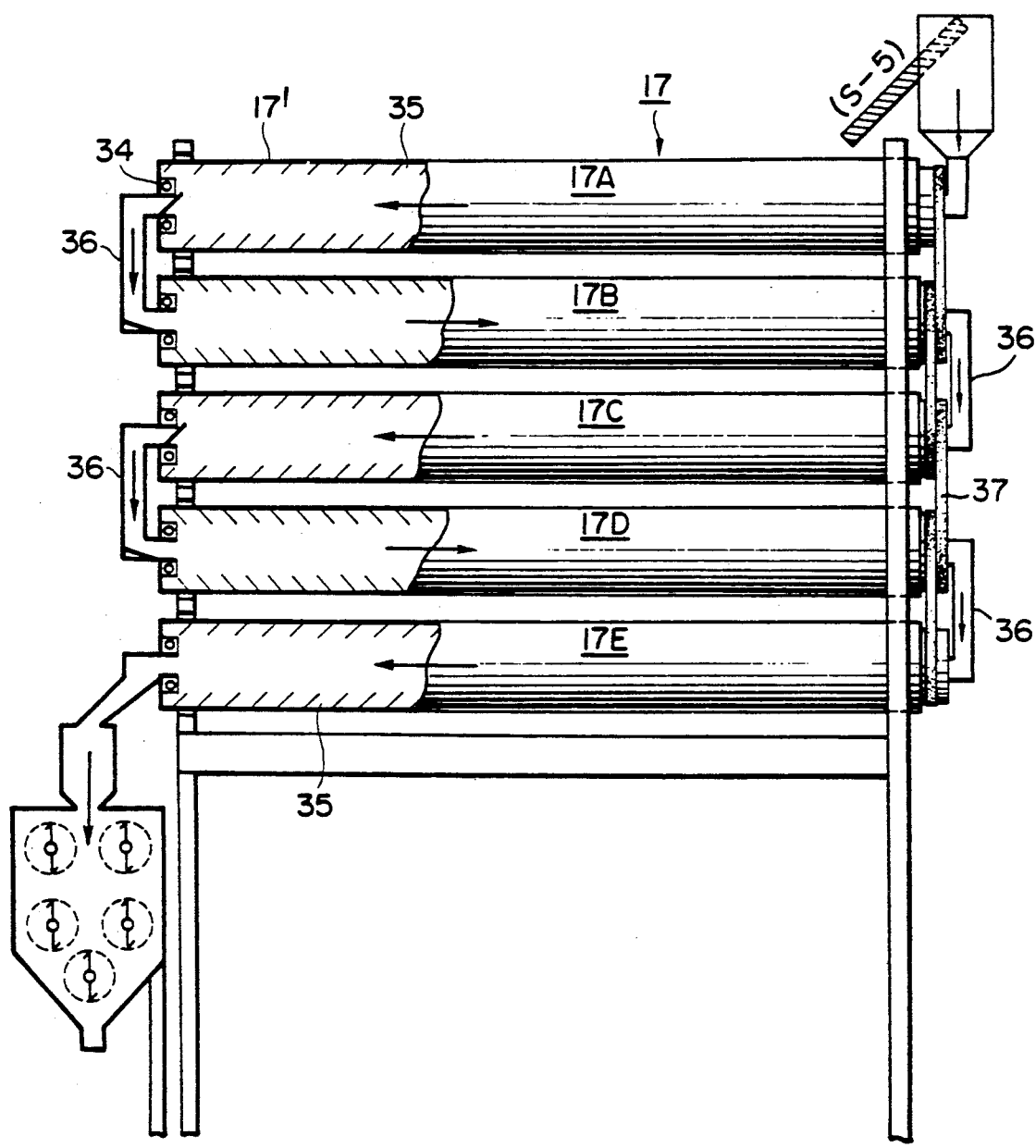
FIG. 12 is a partially sectioned vertical sectional view of the drier in FIG. 9.

As shown in FIG. 12, bearings 34 are fitted onto the central part of both the ends of the drier drum 17 so that the latter is supported rotatably. Specifically, the cultivated mixture is first delivered to a drier drum 17-A with the aid of the screw conveyor S-5. Each of the drier drums 17-A, 17-B, 17-C, 17-D and 17-E is provided with a mixture feeding propeller 35 in the hollow space as defined by the cylindrical configuration thereof so as to displace the mixture in the direction as identified by an arrow mark in the drawings.

As shown in FIGS. 1 and 3, the four drying drums 17-A, 17-B, 17-C and 17-D in the drier 17 are supplied with hot air which is delivered from the steam boiler 7 via a compressor 13 and the cultivated material which is agitated by rotation in that way is displaced forwards in the direction as identified by an arrow mark in the drawing while it is dried by hot air. The optimum temperature of hot air usable for the purpose of drying is determined in the range of 40° to 50° C. Adjustment of the working temperature in the range of 40° to 50° C. assures symbiosis of cultivation bacillus and others whereby organic material (containing symbiosis bacillus and others), that is, organic fertilizer containing nitrogen fixing bacillus to be distributed over agricultural cultivating land, can be activated at the working (drying) temperature which has been adjusted in the above described manner. Since the drier drum is designed in the elongated configuration, drying temperature can be adjusted advantageously.

Figure 13:
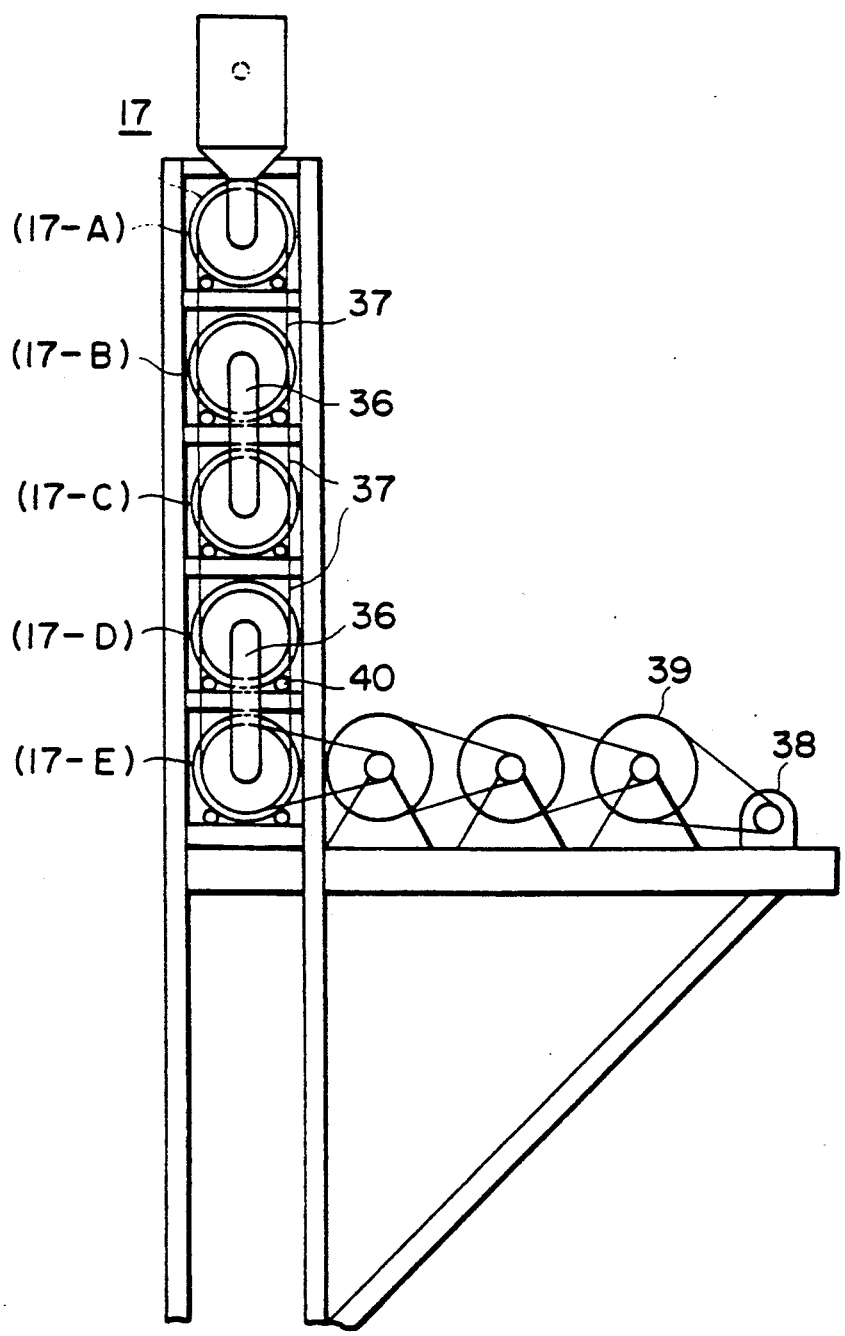
FIG. 13 is a side view of the drier in FIG. 12.

As illustrated in the embodiment in FIG. 12, five stages of rotational drums are communicated with one above another by way of communication pipes 36 so that the mixture in one drum falls down into the interior of the lower drum via the communication pipe 36. To rotate each of the drums the latter are equipped with chain belts 37 at the right ends thereof so that they are slowly rotated at a rotational speed of about 2 revolutions per 10 seconds with the aid of a speed reduction unit including a plurality of adjustable pulleys 39 adapted to be driven by a motor 38 as shown in FIG. 13. In the drawing, reference numeral 40 designates a rotation drum roller. Although among the five drying drums the four drying drums 17-A, 17-B, 17-C and 17-D are so constructed that the mixture held therein is subjected to drying under the effect of hot air in the above-described manner, the lowermost drying drum 17-E is operated to adjust a temperature for storing the mixture and a cool air supply pipe 57 is extended from the refrigerator 12-A to the drying drum 17-E via a cool air compressor 12-B and a plurality of filters 12-C so that the temperature of the dried mixture is adjusted properly. Namely, temperature adjustment is carried out in such a manner that the cultivated material is held in the cooled state and the thus cooled mixture is accumulated in an accumulating tank 18 in the dried state.

The accumulating tank 18 is intended to serve as a final preparing tank in which stored material is prepared in the form of final product. To obtain a homogenized product, the coral reef powder storage tank 16 is equipped with a screw conveyor S-6 at the lower part thereof so that properly determined amount of coral reef powder is delivered to the accumulating tank 18 in which coral reef powder exhibits its own characteristic nature of absorbing of domestic animal excreta to prepare homogeneous product in the presence of coral reef powder. To carry out mixing of the product, the accumulating tank 18 is provided with an agitating propeller within the interior thereof which is similar to the agitating propellers 24 as shown in FIGS. 6 and 7 in structure. After completion of mixing of the product with the aid of the agitating propeller it is delivered to a storage tank 19 by operating a screw conveyor S-7 which is disposed at the lower part of the accumulating tank 18, as shown in FIGS. 1, 2 and 9.

Figure 10:
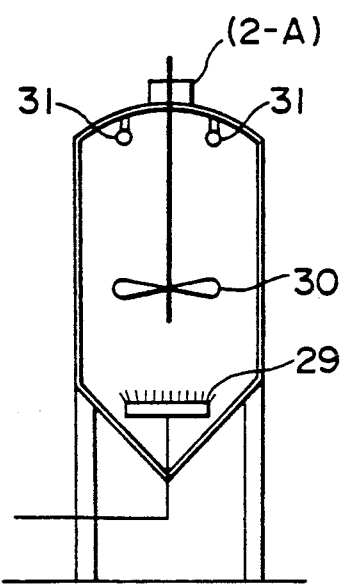
FIG. 10 is a vertical sectional view of a chlorella cultivating tank 2-A.

As cultivation source for achieving the cultivating process as mentioned above, the apparatus of the invention is provided with a chlorella cultivating tank 2-A as shown in FIGS. 1, 3 and 10. Raw material liquid is brought to the tank 2-A from a cultivating area located on the outdoor land. Carbonic acid gas is supplied to the tank 2-A from the upper part of the tank 1 via a pipe 41 as shown in FIG. 3. As is apparent from FIG. 10, an air feeding nozzle 29 is disposed at the lower part of the tank 2-A within the interior of the latter. An amount of carbonic acid gas required for cultivation of chlorella is determined in the range of 2 to 5% and the raw material is sufficiently agitated by rotating an agitating propeller 30 while carbonic acid gas is blown into the tank 2-A.

To keep a sufficient amount of light which is essential for photosynthesis of chlorella, the tank 2-A is equipped with a plurality of chlorella lightening lamps 31 having a capacity of 4,000 to 5,000 luxes at the position located in the proximity of the upper wall thereof. Thus, chlorella is cultivated under the operating conditions as mentioned above and the thus obtained chlorella liquid is then delivered to a centrifugal separator 2-B as shown in FIGS. 1 and 3 in which it is condensed.

The condensed chlorella liquid is delivered to a tank 10 by way of a pipe 52. On the other hand, residual water which is left behind in the tank 2-A after separation of condensed chlorella liquid is delivered to the upper part of a hot water tank 3-A via a pipe 50 to prepare hot water therein. Further, reagents or the like required for the chlorella cultivating tank 2-A are supplied to the latter from a reagent storage tank 9 via a pipe 64.

A typical example of operating conditions of the chlorella cultivating tank 2-A is as shown below.

| liquid substrate | drinking water of 10 liters | (held in a cultivating tank) |
|---|---|---|
| potassium nitrate | $KHO_3$ | 55 g |
| potassium phosphate | $KH_2PO_4$ | 13 g |
| magnesium sulfate | $MgSO_4.7H_2O$ | 25 g |
| iron sulfate | $FeSO_4.7H_2O$ | 0.3 g |
| pH | | 6 to 7 |
| carbonic acid gas | | 3 to 6% |
| temperature | | 30 to 35° C. |
| intensity of light to be emitted chlorella liquid (held in the cultivating tank) | | 4,000 to 5,000 luxes |

Generally, a large scale of production of chlorella liquid is carried out in a pond, pit or vessel located on the outdoor land. Accordingly, a process of production in the chlorella cultivating tank 2-A is intended for the purpose of auxiliary storage of chlorella liquid and the characterizing feature of the present invention resides in a combination of chlorella and nitrogen fixing bacilli both of which assure synergistic effect under the operating condition of symbiosis cultivation as well as a combination of symbiosis bacilli and the above-noted six kinds of operation conditions. It should be noted that the characteristic nature of chlorella is utilized for sewage disposal for the purpose of removing undesirable bacilli.

Next, a hot water tank 3-A,B is disposed at the position located behind the chlorella cultivating tank 2-A, as shown in FIGS. 1 and 3. Specifically, the hot water tank 3-A,B is divided into two chambers 3-A and 3-B and steam generated in the steam boiler 7 is supplied to the hot water tank 3-A, B via a pipe 63 while cooled air prepared in the filters 12-C is supplied thereto via a pipe 53 whereby a temperature best suited for cultivation of cultivating bacilli is obtained. The hot water preparing chamber 3-B is equipped with a liquid agitating propeller 30 for adjusting a temperature as required and hot water adjusted at a certain temperature in that way is delivered to the bacillus cultivation source mixing tank 5 via a pipe 42, as shown in FIG. 3.

A theriac tank 4 serves as a theriac storage tank in which theriac is stored and a properly determined amount of theriac is delivered to the bacillus cultivation source mixing tank 5 as master bacillus source via a pipe 43 whenever it is required, as shown in FIGS. 1 and 3. More particularly, the bacillus cultivation source mixing tank 5 is a mixing tank which has a plurality of functions, one of them being to adjust nutrition with symbiosis bacilli kept in the well-balanced state, the other one being to adjust the temperature and another one being to adjust pH. To practice the above-mentioned functions, nutrition source is collected from predetermined places so as to adjust a degree of nourishing, a temperature and pH at the optimum level. Thus, the bacillus cultivation source mixing tank 5 serves as a cultivation source for cultivating master bacilli while agitating is effected satisfactorily as well as for intensifying activity of the multistage type continuous cultivating bath.

Piping connection to the bacillus cultivation source mixing tank 5 is achieved in such a manner that theriac is introduced thereinto from the theriac tank 4 as nutrition source via the pipe 43, hot water is introduced thereinto from the hot water preparing chamber 3-B via the pipe 42, reagent mixture liquid compounds is introduced therein from the reagent mixture liquid accumulating tank 9 via the pipe 44 to adjust pH, and chlorella condensed liquid is introduced thereinto from the condensed chlorella tank 10 via the pipe 45 so that it is mixed for the purpose of master bacillus cultivation of symbiosis bacillus or the like as well as for the purpose of serving as nutrition source for intensifying cultivation in the cultivating bath.

Reagents are typically prepared in the following manner in weight %. (mixing ratio in the bacillus cultivation source mixing tank 5) per 100 liters of water (containing cultivating liquid therein)

| condensed chlorella liquid (introduced thereinto from the condensed chlorella tank | | 10% |
|---|---|---|
| waste theriac $C_6H_{12}O_6$ | | 0.5% |
| (reagents) | | |
| ammonium sulfate | $(NH_4)_2SO_4$ | 2% |
| urea | $CO(NH_2)_2$ | 2% |
| ammonia water | $NH_4OH$ | 0.5% |
| calcium superphosphate | $CaH_4PO_4$ | 30 g |
| potassium phosphate | $KH_2PO_4$ | 120 g |
| magnesium sulfate | $MgSO_4 \ 7H_2O$ | 250 g |
| potassium nitrate | $KNO_3$ | 550 g |
| Temperature | | 25 to 35° C. |
| pH | | 6 to 7 |

The nutrition source in the form of the mixture mentioned above is satisfactorily agitated in the bacillus cultivation source tank 5, pH of the thus agitated mixture is properly adjusted and the thus prepared mixture is then delivered to the master bacillus cultivating tank 6 via a pipe 46.

Next, several kinds of bacilli which are cultivated under the operating condition of symbiosis cultivation in the master bacillus cultivating tank 6 will be described in more detail in the following.

Generally, nitrogen fixing bacilli usable for agricultural cultivating land comprise *Azotobacter vinelandii*, *Bacillus megaterum* which is effective for symbiosis in the presence of *Azotobacter vinelandii*, *Rhizobium leguminosarm*, *Trichoderma virde* for decomposing raw fiber or the like to produce nutrition for *Azobacter vinelandii* or the like and moreover to saccharify fiber in the form of grape sugar, and *Candida utilis* for decomposing starch and sugar as well as grape sugar produced by *Trichoderma virde* to produce bacillus based protein and thereby intensify nitrogen fixing in the presence of *Azotobacter vinelandii*. Thus, the method of the present invention is characterized in that symbiosis cultivation is achieved with the aid of chlorella under the operating condition of presence of the above-noted five kinds of bacilli wherein chlorella functions to supply organic nutrition or the like to the mixture.

Next, the apparatus in which the above-mentioned kinds of bacilli are added and cultivated is illustrated in FIGS. 1 and 3. Master bacillus cultivating liquid is delivered to the master bacillus cultivating tank 6 via a pip 46 from the bacillus cultivation source mixing tank 5 in which nutrition, temperature and pH are properly adjusted.

Figure 11:
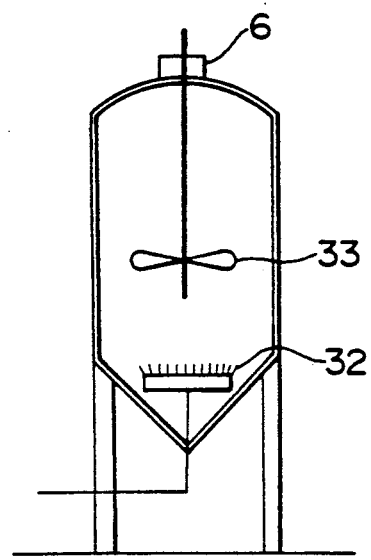
FIG. 11 is a vertical sectional view of a master bacillus cultivating tank.

The method of cultivating master bacilli is practiced in such a manner as mentioned below. As shown in FIG. 11, the master bacillus cultivating tank 6 is provided with an air feeding nozzle 32 and a liquid agitating propeller 33 within the interior thereof, the air feeding nozzle 32 being disposed at the lower part of the tank 6. Further, as shown in FIG. 3, to adjust the cultivating temperature and feed oxygen, cooled air is introduced into the tank 6 from the refrigerator 12-A and the compressor 12-B via a plurality of air filters 12-C whereby master bacillus cultivating is effected under the optimum environmental condition while air is supplied without interruption. As shown in FIG. 3, the thus cultivated master bacilli are introduced into the master bacillus adding tank 11-C and each of the stages of the multistage cultivating bath via pipes in the above-described manner so that they are delivered thereto a cultivation master bacillus for the mixture which is treated in each of the tanks. Thus, proper cultivation is successively achieved in the tanks.

To prepare cultivating substrate in the above-described manner the apparatus is provided with a steam boiler 7 as shown in FIGS. 1 and 3 so that high pressure steam generated in the steam boiler 7 is introduced into a steam drum 11-A via a pipe 48 in which mixture is treated. To adjust the temperature for cultivating chlorella, hot air is delivered to a hot air compressor from the steam boiler 7 via a pipe 59 and moreover it is introduced into a chlorella cultivating tank 2-A via a pipe 60. On the other hand, reagents or the like are delivered to the chlorella cultivating tank 2-A from a reagent mixing and storing tank 9 via a pipe 64 to adjust pH of the mixture therein. Further, hot air is introduced into each of drying drums 17-A, 17-B, 17-C and 17-D in a drier 17 via a pipe 54 to effect drying. These units constituting the apparatus are operatively associated with one another in the above-described manner.

Next, hot water is introduced into a reagent mixing tank 8 from a hot water chamber 3-B via a pipe 49 as shown in FIGS. 1 and 3 so that reagents for preparing cultivation source as mentioned above are added and mixed together in the tank 8. After they are agitated sufficiently therein, the mixture of reagents and hot water is delivered to the reagent mixing and storing tank 9 via a pipe 51 in which the mixture is stored.

As shown in FIGS. 1 and 3, the mixture liquid is delivered to a bacillus cultivation source tank 5 from the reagent mixing and storing tank 9 via a pipe 44 so that nutrition source and pH are adjusted therein in the above-described manner. Further, condensed chlorella is delivered to a condensed chlorella storing tank 10 from a chlorella cultivating tank 2-A via a centrifugal separator 2-B and a pipe 52 so that it is stored in the tank 10, whereas it is delivered to the bacillus cultivation source mixing tank 5 via a pipe 45 in which proper preparation is achieved. Thus, chlorella liquid is supplied to each of the units in order to intensify cultivation and cultivate master bacilli. To carry out pumping-up through each of the pipes, the apparatus is provided with a pump with an automatic control unit attached thereto whereby each of the units as mentioned above is automatically operated by virtue of computing control.

The continuous cultivating process which has been described above with reference to FIGS. 1 to 11 is concerned with a process of producing or organic fertilizer containing nitrogen fixing bacilli therein in a large scale. The thus produced organic fertilizer has the following compositions.

Namely, dried material in a dried material collecting tank 18 has the following compositions.

Table of the compositions (including *Azotobacter vinelandii* and others for the purpose of fixing nitrogen)

| <in weight percent> | |
| --- | --- |
| water soluble material containing nitrogen therein | 30 to 40% |
| calcium carbonate (CaCO$_3$) | 40 to 50% |
| fatty material | 5 to 10% |
| carbohydrate | 6 to 10% |
| ash | 5 to 10% |

According to the method of the invention, material containing nitrogen therein functions in accordance with the mixing ratio of ground cellulose such as domestic animal excreta and the amount of nitrogen fixation in the presence of master bacilli can be increased or decreased as required in accordance with the mixing ratio of nourishing material in the cultivating substrate. Final adjustment as to how much nitrogen is contained in the product is achieved in a coral reef storing tank 16. The tank 16 is provided with a screw conveyor S-6 at the lower part thereof so that coral reef powder is delivered thereto to keep an amount of fixing of nitrogen in the product at a level of 25% while carrying out uniform mixing. As another characteristic feature of coral reef the latter has excellent absorbability which is effective for deodorizing the cultivation odor generated by domestic animal excreta. Thus, the product which is neutralized in odor and therefore is easily handled is then delivered to a storage tank 19 in which packing or a similar operation is performed for the final product to be shipped to users.

This product of organic fertilizer containing nitrogen fixing bacilli therein has advantageous features that acid soil can be reformed owing to alkalinity which is attributable to components in coral reef and several kinds of bacilli such as nitrogen fixing bacillus or the like become reactivated in the agricultural land to activate sterile soil in the presence of organic fertilizer.

Next, description will be made below as to a concrete example of production of organic fertilizer with the use of earth which is suitable for symbiosis cultivation of nitrogen fixing bacillus or the like.

Prior to starting symbiosis cultivation of nitrogen fixing bacillus, earth containing lime therein and having a mesh size smaller than 1 mm is prepared by separating operation and it is then mixed with domestic animal excreta, sewage disposal waste or ground cellulose as organic material source whereby the mixture containing a large amount of lime and coral reef powder both of which function as calcium carbonate (CaCO$_3$) (in order to reform acid earth) is obtained. Thereafter, the mixture is cultivated in the cultivating bath while its pH and temperature properly. The method of producing organic fertilizer containing nitrogen fixing bacilli therein under the operational condition of symbiosis cultivation of nitrogen fixing bacillus, raw fiber decomposing bacillus, yeast fungus and green algae chlorella consists in that granular earth is utilized as a symbiosis cultivation source for nitrogen fixing bacillus or the like.

Composition of the raw material to the cultivating bath 14 will be represented by way of example in the form of ratio by weight in the following.

| <ratio by weight per 100 Kg> | | |
|---|---|---|
| loess or granular earth | (20%) | 20 Kg |
| pulverized coral reef | (30%) | 30 Kg |
| organic compound (hydrocarbon), and excreta of domestic animal or the like (inclusive moisture of 30%) | (30%) | 30 Kg |
| nitrogen bacillus cultivating material (inclusive moisture of 80%) | (20%) | 20 Kg |

Thus, the present invention provides a method of producing organic fertilizer with reuse of nitrogen fixing bacillus constituted in accordance with the compositions as preference above by weight ratio.

It is believed that inorganic components in earth are derived from rock which constitutes the earth shell. Accordingly, chemical compositions of earth are considerably similar to those of the earth shell. Specifically, the largest amount of component in earth is silica acid (SiO) and the next is alumina ($Al_2O_3$), iron oxide ($Fe_2O_3$), lime CaO), magnesium oxide (MgO), potassium oxide ($K_2O$), natrium oxide ($Na_2$) or other element contained in rock.

One example of chemical compositions of earth shell and earth (contained in alluvial soil in Japan) is shown in the following.

| | | earth shell | earth |
|---|---|---|---|
| silicic acid | $SiO_2$ | 59% | 69% |
| alumina | $Al_2O_2$ | 15% | 11% |
| iron oxide | $Fe_2O_3$ | 3% | 11% |
| lime | CaO | 5% | 2% |
| magnesium oxide | MgO | 3% | 1% |
| natrium oxide | $Na_2O$ | 4% | 2% |
| potassium oxide | $K_2O$ | 3% | 1% |
| others | | 3% | 3% |

It is said that inorganic components existing in soil differ according to the way the soil was produced In the case of a country such as Japan where it is warm and it rains often, salts are caused to flow away without any accumulation, resulting in acidification of the soil. For this reason, it becomes necessary to supply lime and neutralizing pH in order to prevent phosphoric acid from being fixed.

Granular earth which is the most favorable for cultivating Azotobacter vinelandii or the like as nitrogen fixing bacillus is found to be loess, volcanic ash soil and coal cinders.

Loess is fine granular material which tends to be piled one above another under the effect of wind. Characteristic features of loess are that (1) no layer is usually built, (2) it contains few grains having a size larger than 0.1 mm and it belongs to cultivating soil or planting cultivation soil in terms of theoretical structure because it is distributed substantially uniformly, (3) it is calcareous and contains a large amount of calcium carbonate ($CaCO_3$) and (4) it is porous. Accordingly, loess is similar to coral reef powder in many respects.

Further, since loess contains a large amount of potassium and phosphoric acid, it is the granular earth which is most suitable as a cultivating substrate for *Azotobacter vinelandii*, that is, nitrogen fixing bacillus. Loess is widely distributed in a large scale over the world including Europe, Asia, South and North America, Argentina and Ukraine.

The present invention contemplates that granular earth derived from the above-mentioned soil is utilized, it is mixed with domestic animal excreta or ground cellulose as an organic compound source, lime, inorganic compounds or the like are added to the to adjust pH while agitating it and temperature of the mixture are adjusted to a required level to effect cultivating in a cultivating bath.

Next, description will be made below as to an example of utilization of granular earth obtained from volcanic ash soil.

Characterizing features of earth obtained from volcanic ash soil and/or coal cinders reside in that it has a small grain size and is porous. Accordingly, water and air permeate easily through it and it has a high intensity of water holding force which causes a large amount of decomposed material to be contained therein, resulting in a cultivating substrate suitable for organic fertilizer containing nitrogen fixing bacilli In America and other countries volcanic ash soil is called "and soil".

As a reference example for representing the chemical compositions of earth obtained from volcanic ash soil, chemical compositions of volcanic ash derived from Sakurajima Island and Aso volcanic mountain will be shown in the following.

| <in weight percent> | Sakurajima | Aso |
|---|---|---|
| loss caused due to heating at a high temperature | 0.16 | 0.04 |
| $SiO_2$ | 60.88 | 51.03 |
| $TiO_2$ | 0.54 | 0.72 |
| $Al_2O_3$ | 19.40 | 17.99 |
| $Fe_2O_3$ | 2.76 | 4.76 |
| FeO | 4.24 | 6.47 |
| MnO | 0.08 | 0.10 |
| MgO | 1.20 | 4.68 |
| CaO | 5.09 | 8.38 |
| $Na_2O$ | 4.19 | 4.02 |
| $K_2O$ | 1.27 | 0.93 |
| $P_2O_5$ | 0.29 | 0.36 |
| $SO_2$ | 0.09 | 0.10 |
| $SiO_2 Al_2O_3$ | 5.33 | 4.81 |
| pH ($H_2O$) | 6.2 | 5.8 |
| C.E.C. me/100 g | 1.46 | 0.55 |

When granular earth derived from volcanic ash soil containing the chemical compositions as noted in the above table is effectively utilized as cultivating substrate for nitrogen fixing bacillus, coral reef powder and inorganic salts such as lime or the like are added thereto while pH and operating temperature are properly adjusted as required, and domestic animal excreta and ground cellulose are then mixed with the thus prepared mixture as organic material source so that symbiosis cultivation is carried out in the presence of *Azotobacter vinelandii* and others.

Although the amount of coral reef ($CaCO_3$) or lime (CaO) to be mixed with the prepared mixture varies appreciably depending on the degree of alkalinity of the soil to be utilized and the mixing ratio of organic nitrogen source, the mixing ratio is generally determined to be domestic animal excreta as carbohydrate organic source amounts to about 30 weight % (30±10 %), ground 40 weight % (40±10%) and coral reef ($CaCO_3$) or lime (CaO) to about 15 to 20 weight %.

Composition of the raw material introduced into the cultivating bath 14 will be represented by way of example in the form of ration by weight in the following.

| <ratio by weight per 100 Kg> | | |
|---|---|---|
| loess or granular earth (inclusive moisture of 10%) | (30%) | 30 Kg |
| pulverized coral reef (inclusive moisture of 10%) | (20%) | 20 Kg |
| organic compound (hydrocarbon), and excreta of domestic animal or the like (inclusive moisture of 30%) | (30%) | 30 Kg |
| nitrogen bacillus cultivating material (inclusive moisture of 80%) | (20%) | 20 Kg |

Although the production step NO. 6 was performed in the presence of nitrogen fixing bacillus mixed with other materials by weight ratio as noted above, the cultivating liquid in which 10% of condensed chlorella liquid, 0.5% of waste theriac and grape sugar, 2% of ammonia sulfate, 2% of urea, 0.5% of ammonia water (all be weight %), 30 grams of calcium superphosphate, 120 grams of potassium phosphate, 250 grams of magnesium sulfate and 550 grams of potassium nitrate were mixed together was contained in the master bacillus cultivating tank (6). Thus, the master bacillus cultivating tank (6) is such that nitrogen bacillus cultivating materials are accumulated therein in the presence of reagents in accordance with the composition ratio as represented by ratio noted above. Domestic animal excreta serving as the organic material supply source may be replaced with ground cellulose.

A mixing ratio of coral reef ($CaCO_3$) is so determined that fine grains having a size of about 200 mesh amount to 10 to 15% and coarse grains amount to 30 to 40%. Incidentally, the characteristic feature of coral reef is that it is porous and absorbs heavy metal therein for the purpose of neutralization and coarse grains thereof having a size larger than 10 mesh have excellent durability in the cultivating soil. Owing to the porosity of coral reef, the latter provides living places for micro-organism in the cultivating soil in the neutralized state. Thus, coral reef powder serving as calcareous material can be effectively utilized by properly adjusting the mixing ratio of fine grain part and coarse grain part.

Volcanic ash soil has a shortage of phosphoric acid component. Accordingly, there is a necessity for properly adjusting the cultivating substrate including grain earth derived from volcanic ash soil by adding a proper amount of phosphoric acid component.

Bacilli to be cultivated comprise *Azotobacter vinelandii* acting as nitrogen fixing bacillus, Bacillus megaterum, Rhizobium leguminosarm, Trichoderma virde acting as raw fiber decomposing bacillus, Candida utilis acting as yeast fungus and green algae chlorella in the same manner as in the case of the above-described cultivating process, each of which is cultivated in the cultivating bath under the operational condition of symbiosis cultivation. Operating temperature and pH are properly adjusted within the interior of the cultivation bath so that cultivating is achieved while air is supplied thereinto. The thus obtained cultivated material is subjected to drying and after completion of drying it becomes required product. Chemical compositions of the product are shown in the following.

| <in weight percent> | |
|---|---|
| water soluble nitrogen component | 30 to 40% |
| calcium carbonate ($CaCO_3$) | 10 to 15% |
| fatty material | 5 to 10% |
| carbohydrate | 5 to 10% |
| ash | 10 to 20% |

The compositions as noted in the above table differ depending on the components in the granular earth and the increase or decrease of nitrogen fixing bacillus or the like is determined in accordance with a mixing ratio of domestic animal excreta serving as organic material and ground cellulose.

Nitrogen compounds in the organic material to be added to granular earth decomposed by *Azotobactor vinelandii* and other bacilli and thereby become inorganic ammonia based on nitrogen or nitric acid based on nitrogen, both of which are absorbed by plants as a nutrition source.

The characterizing features of organic fertilizer containing nitrogen fixing bacilli therein are as noted below.

(1) prevention of oxidation of agricultural land by addition of coral reef ($CaCO_3$), (2) intensification of activity of soil in the presence of nitrogen fixing bacilli, (3) intensification of activity of deteriorated agricultural land by improving the environmental conditions, (4) neutralization of harmful heavy metal by absorption of the latter into coral reef, and (4) increased resistant function against disease bacillus of plant in the presence of *Trichoderma virde*.

In the first-mentioned embodiment among the plural embodiments of the present invention, compounding ratios for "domestic animal excreta and sewage disposal waste", "ground cellulose" and "coral reef powder" are determined (in weight percent) in the range of "30±10%", "10±5%" and "60±20%" respectively. This is because of the fact that when they exceed the upper limit, there occur malfunctions as organic fertilizer and when they decrease below the lower limit, each of components in the fertilizer fails to function satisfactorily to accomplish their intended object.

Further, in the last-mentioned embodiment of the present invention description has been made in such a manner that (in weight percent) "domestic animal excreta or the like amounts to 30±10%", "ground cellulose does to 10±5%", "granular earth does to 40±10%" and "coral reef or lime does to 15 to 20%". The manner of description in this way is based on the same reasons as mentioned in the foregoing case.

As will be readily apparent from the above description, the method and apparatus of the present invention provide the remarkably advantageous effect that organic fertilizer which is effective for increased production of agricultural product can be economically produced on the basis of mass production While the present invention has been described above with respect to preferred embodiments thereof, it should of course be understood that it should not be limited only to them but various changes or modifications may be made in any acceptable manner without departure from the spirit and scope of the invention as defined by the appended claims.

What is claimed:

1. A method of producing organic fertilizer, comprising:
   preparing a coral reef mixture including between about 40 to 80 weight % coral reef granular powder, 20 to 40 weight % domestic animal excrement and sewage disposal waste and 5 to 15 weight % ground cellulose;
   cultivating a bacillus mixture including nitrogen fixing bacillus in the presence of organic compounds and inorganic compounds as a nutrient source for the bacillus and for adjusting the pH of the second mixture to between about 5.5 and 7.5 at a temperature between about 25° and 35° C.; and
   combining the bacillus mixture with the coral reef mixture in a cultivating bath and cultivating the cultivating mixture under symbiosis conditions to yield an organic fertilizer.

2. The method of claim 1, further including the step of adding chlorella to the bacillus mixture as a nutrient source for the bacillus.

3. The method of claim 1, wherein the nitrogen fixing bacillus is *Azotobacter vinelandii*.

4. The method of claim 2, wherein the nitrogen fixing bacillus is *Azotobacter vinelandii*.

5. The method of claim 3, wherein the nitrogen fixing bacillus also includes at least one bacillus selected from the group consisting of *Bacillus megaterum, Rhizobium leguminosarm, Candida utilis, Trichoderma virde* and mixtures thereof.

6. The method of claim 1, further including the step of adding chlorella to the bacillus mixture as a nutrient source for the bacillus.

7. The method of claim 1, wherein the organic compounds and inorganic compounds for providing nutrients and adjusting the pH of the bacillus mixture include at least one compound selected from the group consisting of grape sugar, ammonium sulfate, urea, ammonia, calcium superphosphate, magnesium sulfate, potassium nitrate and mixtures thereof.

8. The method of producing organic fertilizer of claim 1, wherein the coral reef mixture is sterilized and softened by boiling before combining with the bacillus mixture.

9. The method of producing organic fertilizer of claim 1, wherein the coral reef granular powder has a grain size between about 10 and 200 mesh.

10. The method of producing organic fertilizer of claim wherein the ground cellulose is derived from plant fiber.

11. The method of producing organic fertilizer of claim 1, wherein the cultivating is performed in a multi-bath type cultivating apparatus.

12. The method of producing organic fertilizer of claim 10, wherein cultivation is continuously achieved with a time difference of H/N wherein H is cultivation time in hours and is the number of cultivating baths.

13. The method of producing organic fertilizer of claim 1, wherein the pH of the cultivating bath is adjusted to between about 6 and 7.

14. The method of producing organic fertilizer of claim 1, wherein the coral reef powder includes a calcareous ($CaCO_3$) component or a lime ($CaO$) component.

15. The method of producing organic fertilizer of claim 1, wherein granular earth is added to the coral reef mixture.

16. The method of producing organic fertilizer of claim 14, wherein the granular earth is selected from the group consisting of loess, volcanic ash soil, coal cinders and mixtures thereof.

17. The method of producing organic fertilizer of claim 1, including the step of drying the fertilizer with hot air.

18. A method of producing organic fertilizer, comprising:
    preparing a first coral reef mixture including between about 40 to 80 weight % coral reef granular powder, 20 to 40 weight % domestic animal excrement and sewage disposal waste, and 5 to 15 weight % ground cellulose,
    cultivating a chlorella containing liquid while exposing the chlorella to sufficient light for cultivation of the chlorella;
    cultivating a second bacillus mixture including nitrogen fixing bacillus in the presence of organic compounds and inorganic compounds serving as a nutrient source for the bacillus and for adjusting the pH of the bacillus mixture to between about 5.5 and 7.5 while maintaining the temperature of the second mixture between about 25° and 35° C.; and
    combining the bacillus mixture with the first mixture to form a cultivating mixture and cultivating the cultivating mixture in a multi-stage cultivating bath under symbiosis conditions to yield an organic fertilizer.

19. The method of claim 18, wherein the nitrogen fixing bacillus includes *Azotobacter vinelandii, Bacillus megaterum, Rhizobium leguminosarm, Candida utilis* and *Trichoderma virde*.

20. The method of claim 18, including cultivating a chlorella containing liquid and adding the chlorella containing liquid to the bacillus mixture as a nutrient source for the bacillus.

21. An organic fertilizer prepared by the process of:
    mixing between about 40 to 80 weight % coral reef granular powder, 20 to 40 weight % domestic animal excrement and sewage disposal waste and 5 to 15 weight % ground cellulose to obtain a first mixture;
    cultivating a second mixture including at least one nitrogen fixing bacillus in the presence of organic compounds and inorganic compounds to provide nutrients for the bacillus and adjusting the pH to between about 5.5 and 7.5 and maintaining the temperature between about 25° and 35° C.;
    adding chlorella to the second bacillus mixture as a nutrient for the bacillus;
    combining the second bacillus mixture with the first mixture to form a cultivating mixture and cultivating said cultivating mixture in a cultivating bath, under symbiosis cultivation conditions to yield the organic fertilizer.

22. The organic fertilizer of claim 21, wherein the bacillus mixture includes *Azotobacter vinlandii, Bacillus megaterum, Rhizobium leguminosarm, Candida utilis* and *Trichoderma virde*.

23. The organic fertilizer of claim 21, wherein the first coral reef mixture includes granular earth.

* * * * *